US011312545B2

(12) United States Patent
Wang (10) Patent No.: US 11,312,545 B2
(45) Date of Patent: Apr. 26, 2022

(54) TAMPER-RESISTANT AIR-PERMEABLE CONTAINER

(71) Applicant: SOUTH PLASTIC INDUSTRY CO., LTD., New Taipei (TW)

(72) Inventor: Tong-Chang Wang, New Taipei (TW)

(73) Assignee: SOUTH PLASTIC INDUSTRY CO., LTD., New Taipei (TW)

( * ) Notice: Subject to any disclaimer, the term of this patent is extended or adjusted under 35 U.S.C. 154(b) by 38 days.

(21) Appl. No.: 17/033,957

(22) Filed: Sep. 28, 2020

(65) Prior Publication Data

US 2021/0139206 A1 May 13, 2021

(30) Foreign Application Priority Data

Nov. 8, 2019 (TW) .................................. 108140742

(51) Int. Cl.
*B65D 43/02* (2006.01)

(52) U.S. Cl.
CPC ...... *B65D 43/0272* (2013.01); *B65D 2205/00* (2013.01); *B65D 2401/00* (2020.05)

(58) Field of Classification Search
CPC ............ B65D 43/0272; B65D 43/0264; B65D 43/0235; B65D 43/021; B65D 43/0204; B65D 43/0214; B65D 39/16; B65D 45/16
USPC ....... 220/789, 780, 324, 315, 805, 802, 801, 220/796, 266, 265, 260
See application file for complete search history.

(56) References Cited

U.S. PATENT DOCUMENTS

| 6,116,501 | A | * | 9/2000 | Hupp | B65D 1/225 229/125.09 |
| 9,016,503 | B2 | * | 4/2015 | Barbier | B65D 43/162 220/270 |
| 2005/0161455 | A1 | * | 7/2005 | Studee | B65D 43/0281 220/266 |
| 2012/0292322 | A1 | * | 11/2012 | Meyer | B65D 43/0258 220/270 |
| 2014/0035867 | A1 | * | 2/2014 | Azumi | G06F 3/0412 345/174 |
| 2017/0057706 | A1 | * | 3/2017 | Wang | B65D 43/0254 |
| 2017/0121080 | A1 | * | 5/2017 | Wang | B65D 25/54 |
| 2018/0194523 | A1 | * | 7/2018 | Plummer | B65D 75/5833 |
| 2018/0273254 | A1 | * | 9/2018 | Hansen | B65D 43/0262 |
| 2020/0055639 | A1 | * | 2/2020 | Snedden | B65D 43/0204 |

FOREIGN PATENT DOCUMENTS

GB        2040267 A  *  8/1980  ....... B29C 66/81431

* cited by examiner

*Primary Examiner* — Robert J Hicks
(74) *Attorney, Agent, or Firm* — Leong C. Lei (57) ABSTRACT

A tamper-resistant air-permeable container includes a cover having a bottom that is formed with a first wall having primary troughs and primary blocks and formed with a retaining engagement portion; and a box including a receiving space and having a second wall that is provided with a first step part lower than the second wall and a second step part lower than the first step part to define forming therebetween a retaining engagement groove. The second wall is formed with secondary troughs, each including a curved section, such that each of the secondary troughs has a curved configuration. When the cover is combined with the box, the retaining engagement portions of the cover are fit into and retained in the retaining engagement groove. The primary troughs and the secondary troughs form passages in communication with the receiving space.

5 Claims, 7 Drawing Sheets

TAMPER-RESISTANT AIR-PERMEABLE CONTAINER

TECHNICAL FIELD OF THE INVENTION

The present invention relates to a container, and more particularly to a container that has excellent air permeability, is unrecoverable after being opened, and is tamper-evident with bare eyes.

DESCRIPTION OF THE PRIOR ART

Various plastic containers that are made through vacuum forming are available, including boxes, cups, or bowls, which are fit for storage of food in order to keep the food fresh. However, for the containers that are currently available, air permeability is achieved by means of simple hole-like features, and foreign objects and dust and even a sharp object that is intentionally used by an unauthorized person may penetrate through the holes to damage or destruct the food or fruits contained in the container or even a needle may be used to inject medicine or drug into the food or fruits. In view of such problems, the air permeable structure requires further improvement.

Further, some consumers may open the plastic container, with proper authorization, to check if the food contained in the container is intact and fresh. This would damage the container and cause contamination to the food contained in the container.

The plastic containers have been improved to include a tamper-evident feature. Such a feature often involves a breakable perforation line. An edge generated through breaking of the perforation line may be re-fit to a torn part, making it hard for a user to identify, with bare eyes, if the container has been opened. This requires further improvement for the plastic container.

SUMMARY OF THE INVENTION

In view of the above problems, the present invention provides a tamper-resistant air-permeable container, which comprises: a cover having a bottom that is formed with a first wall in the form of a loop, the first wall having an outward-facing surface that is formed with a plurality of primary troughs that are spaced from each other, each of the primary troughs including a primary block arranged therebetween, the first wall and each of the primary blocks being each formed with a retaining engagement portion on a lower portion of the outward-facing surface; and a box, which includes a receiving space, the box having a top surface that is formed with a second wall, the second wall having an inward-facing surface that is provided with a first step part having a height lower than the second wall and a second step part having a height lower than the first step part, the first, step part and the second step part forming therebetween a retaining engagement groove, the inward-facing surface of the second wall being formed with a plurality of secondary troughs, each of the secondary troughs including a curved section, such that each of the secondary troughs has a curved configuration, wherein when the cover is combined with the box, the retaining engagement portions of the cover are fit into and retained in the retaining engagement groove and each of the primary blocks is set in coupling engagement with the first step part and the second step part, so that each of the primary troughs is set to correspond to each of the secondary troughs to form a passage that is in communication with the receiving space.

Advantage of the present invention are as follows:

Based on the above-described structure, when the cover is set in combination with the box, the passage formed of each of the primary troughs and each of the secondary troughs provide an effect of air permeation, in order to protect fruits placed in the container from deteriorating, and since each of the secondary troughs is set in curved configuration, it is possible to greatly reduce the potential risk of entry of a foreign object or an unauthorized person intentionally damaging the fruits or injecting illegal drugs into the fruits with a needle.

The primary coupler and the secondary coupler once coupled are not easily detached and the secondary coupler, upon being torn open, is still kept in combination with the primary coupler and is caused to restore in position by the plate, so as to set the secondary coupler to locate above the secondary notch with the plate being pushed outside the secondary notch, so as not to re-engage with the secondary notch, consequentially, a user may easily identify that the secondary coupler has been torn open.

DETAILED DESCRIPTION OF THE PREFERRED EMBODIMENT

Figure 1:
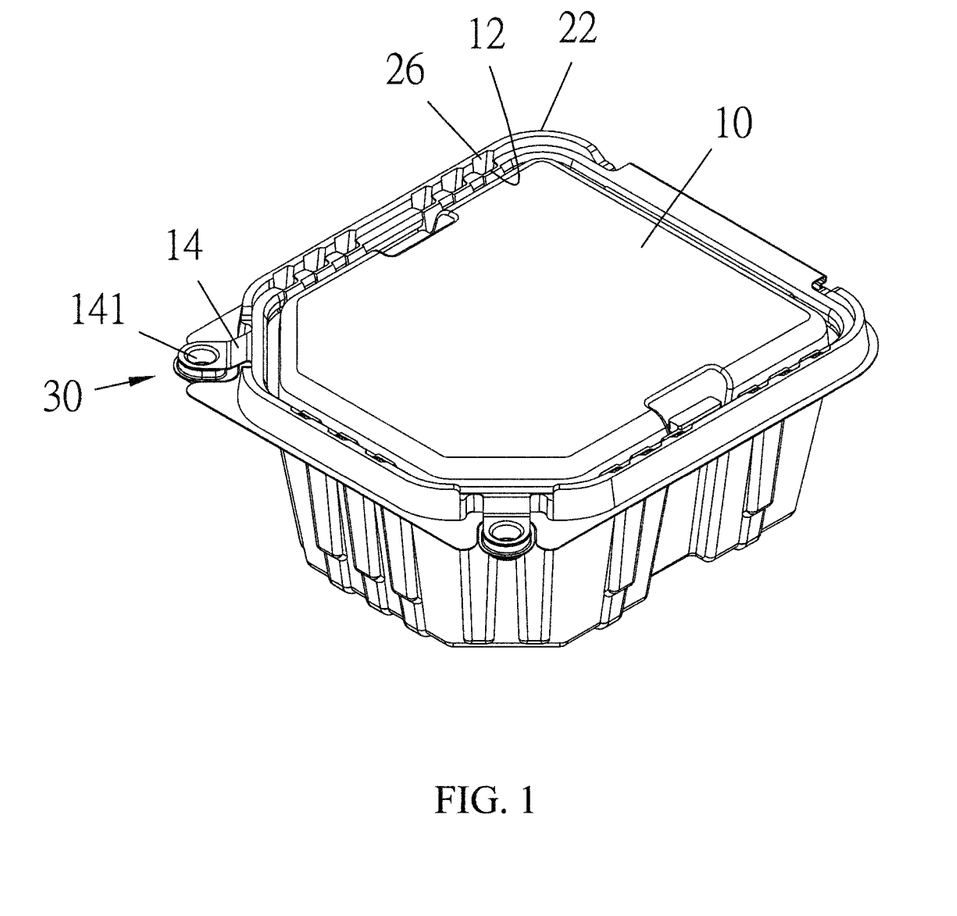
FIG. 1 is a perspective view showing the present invention in a condition that a cover is closed.
Figure 2:
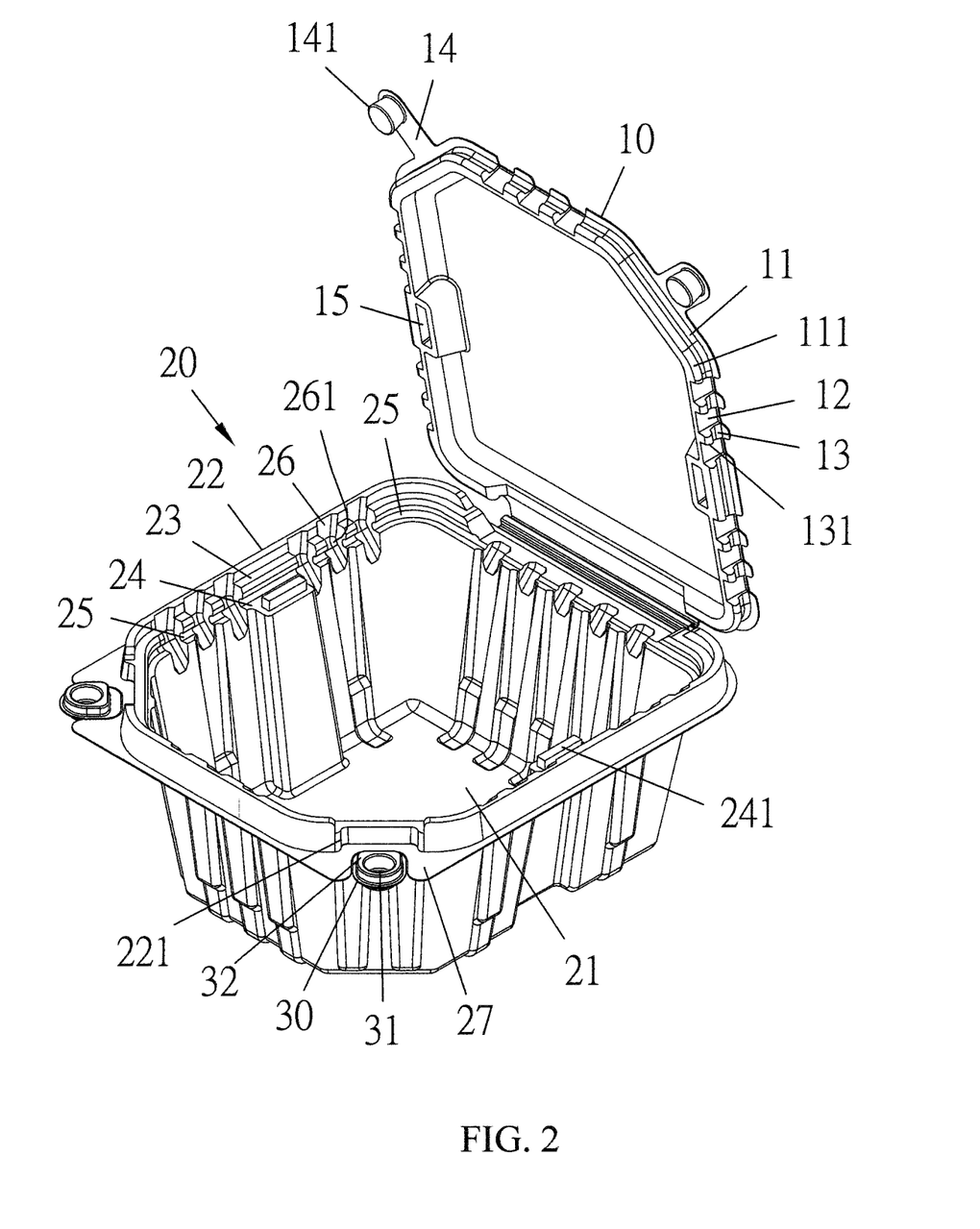
FIG. 2 is a perspective view showing the present invention in a condition that the cover is opened.

Referring to FIGS. 1 and 2, the present invention provides a tamper-resistant air-permeable container, which comprises the following components:

A cover 10 has a bottom that is provided with a first wall 11, in the form of a loop and perpendicular to the cover 10. The first wall 11 is arranged adjacent to a peripheral edge of the cover 10. The first wall 11 has an outward-facing surface that is formed with a plurality of primary troughs 12 that are spaced from each other. Each of the primary troughs 12 includes a primary block 13 arranged therebetween. The first wall 11 and each of the primary blocks 13 are each formed with a retaining engagement portion 111, 131 on a lower portion of the outward-facing surface.

The peripheral edge of the cover 10 is extended such that a corrugated configuration of a combination of projections and recesses is formed as the edge extends to follow each of the primary troughs 12, in order to increase an amount of air permeation.

The cover 10 has a top, from one side of which a plate 14 that is made elastic or flexible, is extended. The plate 14 has a predetermined length and has an end that is formed with primary coupler 141 facing downward.

Figure 3:
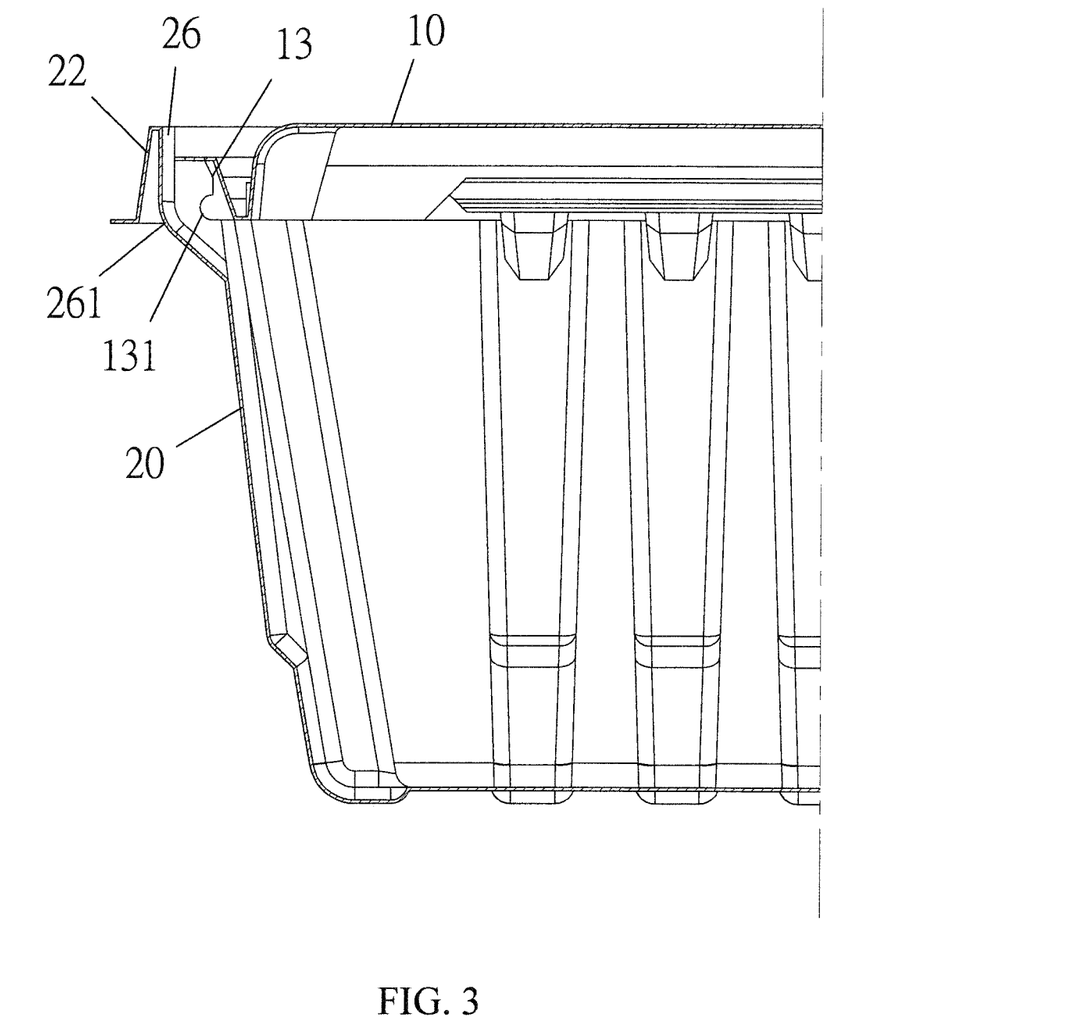
FIG. 3 is a cross-sectional view of FIG. 1.
Figure 4:
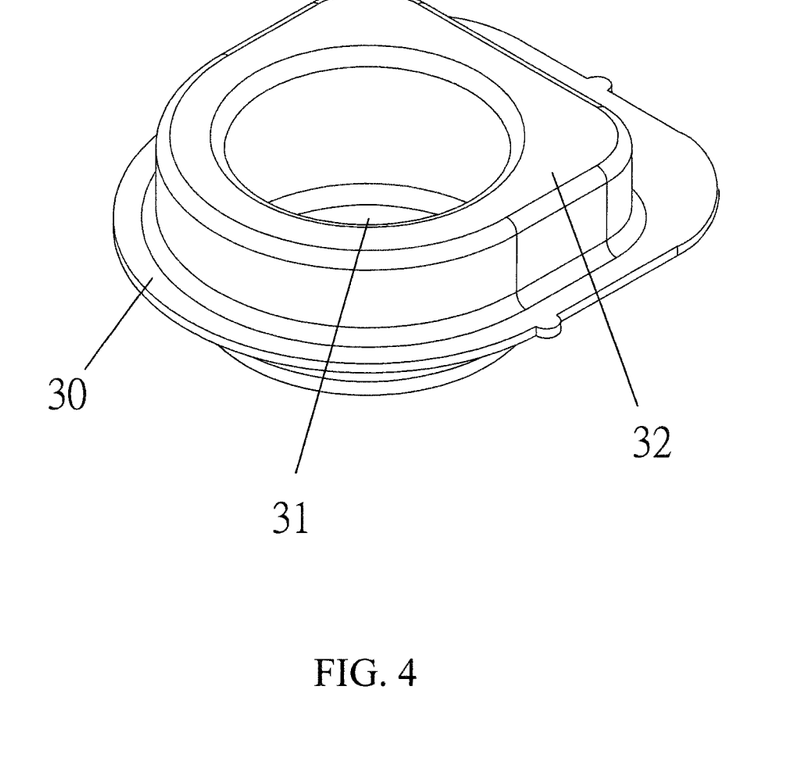
FIG. 4 is a perspective view showing a secondary coupler of the present invention.
Figure 5:
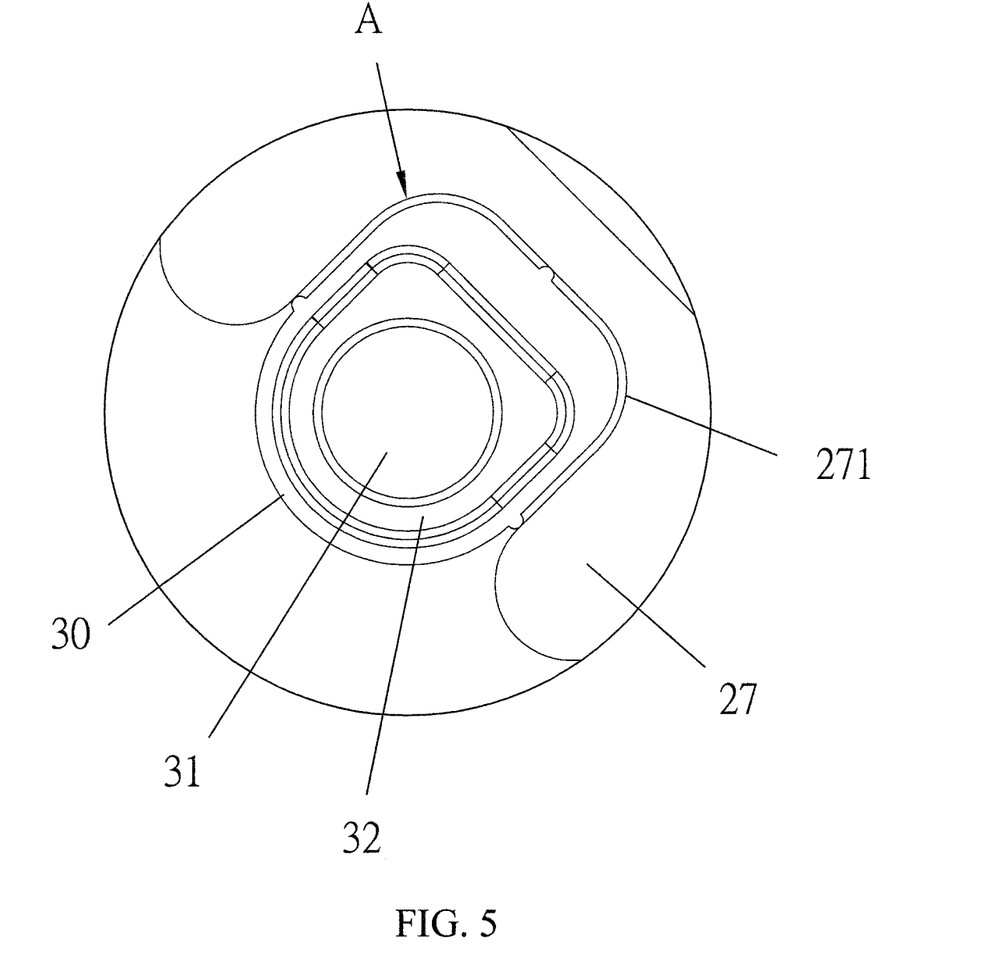
FIG. 5 is a top plan view showing the secondary coupler and a secondary notch according to the present invention.
Figure 6:
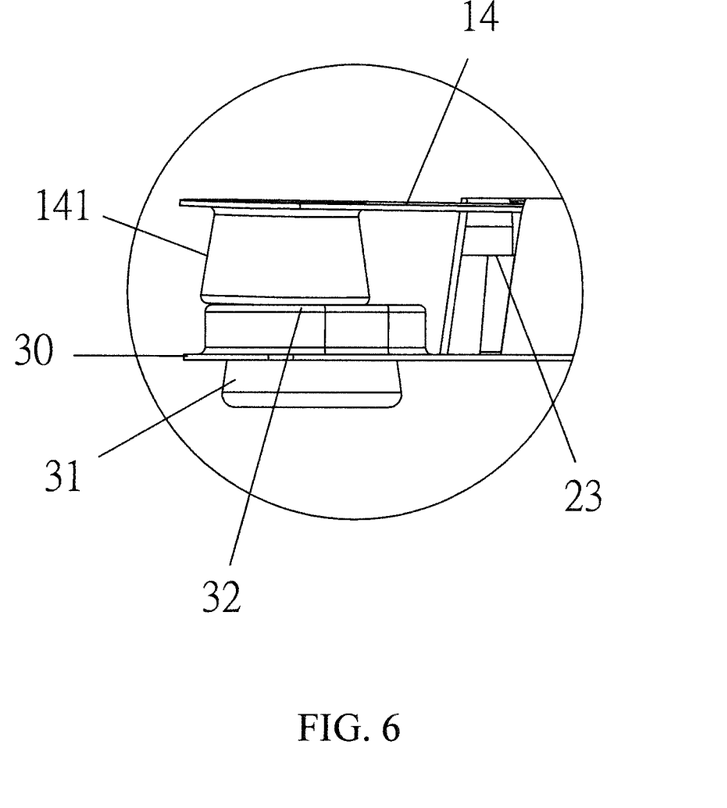
FIG. 6 is a schematic view showing positional deviation between a first coupler and a tertiary trough according to the present invention.

Referring to FIGS. 2 and 3, a box 20 includes a receiving space 21 that is in communication with the outside. The box 20 has a top surface that is formed with a second wall 22 perpendicular thereto. The second wall 22 has an inward-facing surface that is provided with a first step part 23 having a height lower than the second wall 22 and a second step part 24 having a height lower than the first step part 23. The first step part 23 and the second step part 24 form therebetween a retaining engagement groove 25. The inward-facing surface of the second wall 22 is formed with a plurality of secondary troughs 26, and each of the secondary troughs 26 includes a curved section 261, such that each of the secondary troughs 26 exhibits a curved or bent configuration. When the cover 10 is combined with the box 20, the retaining engagement portions 111, 131 of the cover 10 are fit into and retained in the retaining engagement groove 25 and each of the primary blocks 13 is set in coupling engagement with the first step part 23 and the second step part 24, so that each of the primary troughs 12 is set to correspond to a corresponding one of the secondary troughs 26 to faun a passage that is in communication with the receiving space 21.

Referring to FIGS. 1-5, the second wall 22 of the box 20 includes at least one primary notch 221, and a flange 27 is extended horizontally in an outward direction from a bottom of the second wall. The flange includes a secondary notch 271, and the secondary notch 271 is connected, through a perforation line A, with a secondary coupler 30. The secondary coupler 30 includes a tertiary trough 31.

Figure 7:
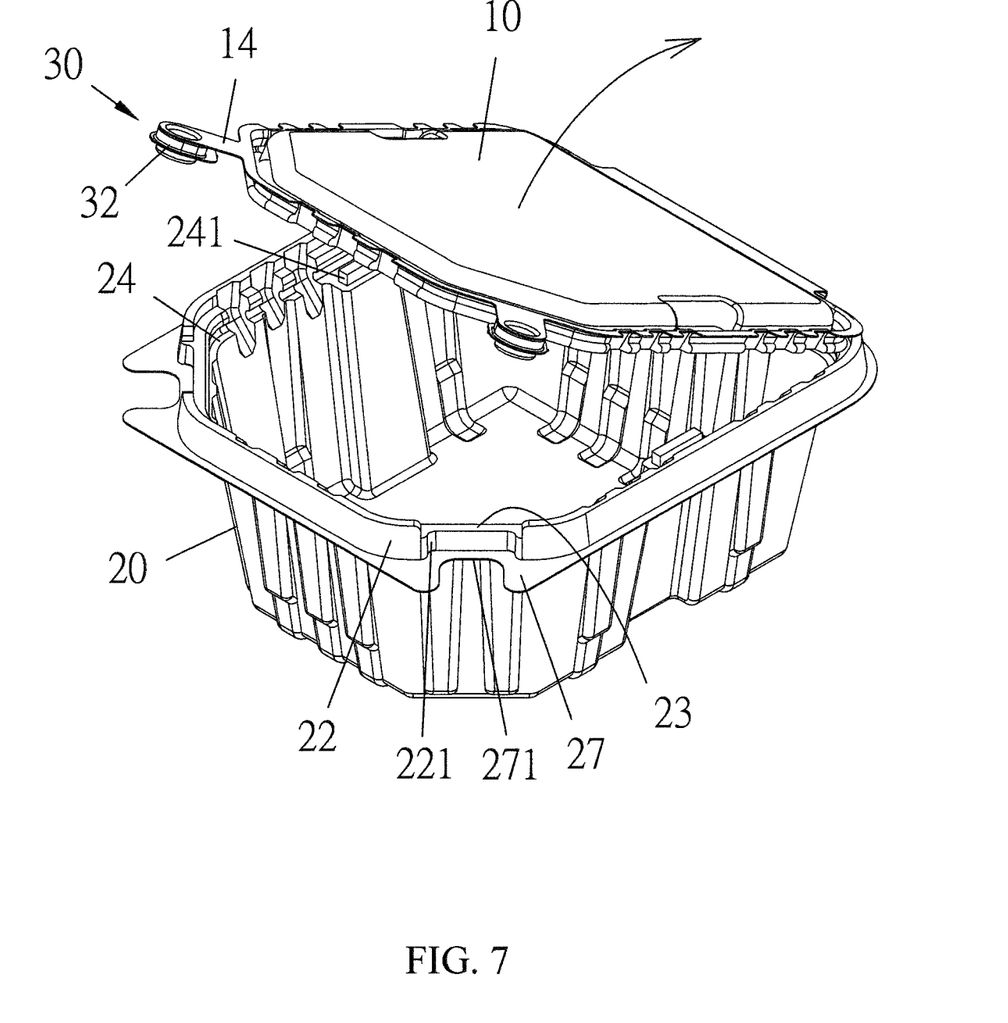
FIG. 7 is a schematic view showing separation between the second coupler and the secondary notch according to the present invention.

Referring to FIGS. 1 and 7, when the cover 10 is combined to the top of the box 20, a bottom of the plate 14 is brought into contact with a top of the first step part 23, resulting in positional deviation between the primary coupler 141 and the tertiary trough 31, and pressing down the plate 14 causes a change of a direction of the primary coupler 141 to correspond to the tertiary trough 31, allowing the primary coupler 141 to engage with and is thus coupled to the tertiary trough 31. Once the secondary coupler 30 is torn along the perforation line A, the plate 14 restores a home position by means of the elasticity thereof, making the secondary coupler 30 located above the secondary notch 271 and a height difference is thus generated and the plate 14 is moved outside the secondary notch 271. As such, the secondary coupler 30 can no longer be fit into and retained in the secondary notch 271, and consequentially, a user may easily identify that the secondary coupler 30 has been torn open.

The first wall 11 of the cover 10 may be further provided, on an inward-facing surface thereof, with at least one positioning recess 15, and the second step part 24 is provided with at least one positioning projection 241, wherein when the cover 10 is combined with the box 20, the positioning projection 241 enters the positioning recess 15.

The secondary coupler 30 includes a flat platform portion 32 in an annular or ring configuration. The tertiary trough 31 is located inboard the flat platform portion 32. When the primary coupler 141 is brought into engagement with the tertiary trough 31, a top of the flat platform portion 32 is set in contact engagement with the bottom of the plate 14.

The tertiary trough 31 is made in a top-narrowed and bottom-widened form, in order to make force or tight fitting between the primary coupler 141 and the tertiary trough 31.

I claim:

1. A tamper-resistant air-permeable container, comprising:
    a cover, which has a bottom that is provided with a first wall in the form of a loop and perpendicular to the cover, the first wall being adjacent to a peripheral edge of the cover, the first wall having an outward-facing surface that is formed with a plurality of primary troughs that are spaced from each other, each of the primary troughs including a primary block arranged therebetween, the first wall and each of the primary blocks being each formed with a retaining engagement portion on a lower portion of the outward-facing surface; and
    a box, which includes a receiving space that is in communication with the outside, the box having a top surface that is formed with a second wall perpendicular thereto, the second wall having an inward-facing surface that is provided with a first step part having a height lower than the second wall and a second step part having a height lower than the first step part, the first step part and the second step part forming therebetween a retaining engagement groove, the inward-facing surface of the second wall being formed with a plurality of secondary troughs, each of the secondary troughs including a curved section, such that each of the secondary troughs has a curved configuration, wherein when the cover is combined with the box, the retaining engagement portions of the cover are fit into and retained in the retaining engagement groove and each of the primary blocks is set in coupling engagement with the first step part and the second step part, so that each of the primary troughs is set to correspond to each of the secondary troughs to form a passage that is in communication with the receiving space.

2. The tamper-resistant air-permeable container according to claim 1, wherein the cover has a top, from one side of which a plate that is made elastic, is extended, the plate having a predetermined length and having an end that is formed with a primary coupler facing downward; the second wall of the box includes at least one primary notch, a flange being extended horizontally in an outward direction from a bottom of the second wall, the flange including a secondary notch, the secondary notch being connected through a perforation line with a secondary coupler, the secondary coupler including a tertiary trough, wherein when the cover is combined to the top of the box, a bottom of the plate is brought into contact with a top of the first step part, resulting in positional deviation between the primary coupler and the tertiary trough; and pressing down the plate causes a change of a direction of the primary coupler to correspond to the tertiary trough, allowing the primary coupler to engage with and is thus coupled to the tertiary trough; and after the secondary coupler is torn along the perforation line, the plate restores a home position by means of the elasticity thereof, making the secondary coupler located above the secondary notch and thus, a height difference is generated and the plate is moved outside the secondary notch, so that the secondary coupler is not re-engageable with and retained in the secondary notch.

3. The tamper-resistant air-permeable container according to claim 2, wherein the secondary coupler includes a flat platform portion in an annular form and the tertiary trough is located inboard of the flat platform portion, wherein when the primary coupler is brought into engagement with the tertiary trough, a top of the flat platform portion is set in engagement with a bottom of the plate.

4. The tamper-resistant air-permeable container according to claim 3, wherein the tertiary trough is made in a top-narrowed and bottom-widened form, in order to make force fitting between the primary coupler and the tertiary trough.

5. The tamper-resistant air-permeable container according to claim 1, wherein the first wall of the cover is further provided, on an inward-facing surface thereof, with at least one positioning recess, and the second step part is provided with at least one positioning projection, wherein when the cover is combined with the box, the positioning projection enters the positioning recess.

\* \* \* \* \*